(12) United States Patent
Walsh et al.

(10) Patent No.: US 8,738,711 B2
(45) Date of Patent: May 27, 2014

(54) SYSTEM AND METHOD FOR REDIRECTING CLIENT-SIDE STORAGE OPERATIONS

(75) Inventors: Richard J. Walsh, Raleigh, NC (US); Alfredo C. Issa, Apex, NC (US)

(73) Assignee: Oto Technologies, LLC, Raleigh, NC (US)

( * ) Notice: Subject to any disclaimer, the term of this patent is extended or adjusted under 35 U.S.C. 154(b) by 415 days.

(21) Appl. No.: 12/611,725

(22) Filed: Nov. 3, 2009

(65) Prior Publication Data

US 2011/0106874 A1    May 5, 2011

(51) Int. Cl.
*G06F 15/16*    (2006.01)

(52) U.S. Cl.
USPC .................. 709/206; 709/203; 709/207

(58) Field of Classification Search
USPC .................. 709/203, 206, 207, 219
See application file for complete search history.

(56) References Cited

U.S. PATENT DOCUMENTS

| | | | | |
|---|---|---|---|---|
| 5,774,670 A * | 6/1998 | Montulli | | 709/227 |
| 5,796,952 A * | 8/1998 | Davis et al. | | 709/224 |
| 5,838,906 A * | 11/1998 | Doyle et al. | | 715/205 |
| 6,266,681 B1 | 7/2001 | Guthrie | | |
| 6,944,828 B2 | 9/2005 | Gao et al. | | |
| 7,197,044 B1 * | 3/2007 | Kadambi et al. | | 370/418 |
| 7,360,210 B1 | 4/2008 | Vacanti et al. | | |
| 7,383,288 B2 * | 6/2008 | Miloushev et al. | | 1/1 |
| 7,526,520 B2 * | 4/2009 | Laux et al. | | 709/203 |
| 7,991,734 B2 | 8/2011 | Park et al. | | |
| 8,010,630 B2 | 8/2011 | Barreto et al. | | |
| 8,051,057 B2 | 11/2011 | Abu-Hakima et al. | | |
| 8,296,357 B2 | 10/2012 | Stone et al. | | |
| 8,527,860 B1 * | 9/2013 | Colton et al. | | 715/205 |
| 2002/0078192 A1 * | 6/2002 | Kopsell et al. | | 709/223 |
| 2003/0028731 A1 * | 2/2003 | Spiers et al. | | 711/147 |
| 2003/0154314 A1 * | 8/2003 | Mason et al. | | 709/250 |
| 2003/0233400 A1 | 12/2003 | Pinal | | |
| 2004/0103220 A1 * | 5/2004 | Bostick et al. | | 709/253 |
| 2005/0021791 A1 * | 1/2005 | Sakiyama et al. | | 709/229 |
| 2005/0086300 A1 * | 4/2005 | Yeager et al. | | 709/204 |
| 2005/0144479 A1 * | 6/2005 | Son | | 713/201 |
| 2005/0289218 A1 | 12/2005 | Rothman et al. | | |
| 2006/0069785 A1 * | 3/2006 | Barrett | | 709/229 |
| 2007/0083522 A1 * | 4/2007 | Nord et al. | | 707/10 |
| 2007/0150602 A1 * | 6/2007 | Yared et al. | | 709/227 |
| 2007/0244987 A1 * | 10/2007 | Pedersen et al. | | 709/217 |
| 2008/0072311 A1 * | 3/2008 | Mullick et al. | | 726/15 |
| 2008/0184128 A1 * | 7/2008 | Swenson et al. | | 715/738 |
| 2009/0037517 A1 | 2/2009 | Frei | | |
| 2009/0248839 A1 | 10/2009 | Blue et al. | | |
| 2009/0300136 A1 | 12/2009 | Loo | | |
| 2011/0078333 A1 | 3/2011 | Jakubowski | | |

OTHER PUBLICATIONS

"Safari Client-Side Storage and Offline Applications Programming Guide," Jun. 24, 2009, Apple Inc.

(Continued)

*Primary Examiner* — Sargon Nano
(74) *Attorney, Agent, or Firm* — Withrow & Terranova, PLLC

(57) ABSTRACT

A method and apparatus for redirecting client-side storage operations to one or more remote storage devices. An HTTP message generated by a web server includes one or more client-side storage operations. Based on defined criteria, the client-side storage operations are replaced with remote storage instructions to generate a modified HTTP message. The modified HTTP message is sent towards the client device. A user agent on the client device receives the HTTP message and executes the remote storage instructions. The storage operations are implemented on the remote storage devices rather than on the client.

17 Claims, 7 Drawing Sheets

(56) References Cited

OTHER PUBLICATIONS

Trivero, Alberto, "Abusing HTML 5 Structured Client-side Storage," Oct. 17, 2008, SEC Discover.

Almaer, Dion, "HTML5 Features in Latest iPhone; Application Cache and Database," Ajaxian website, Feb. 3, 2009, http://ajaxian.com/archives/html5-features-in-latest-iphone-application-cache-and-database.

Eidson, Brady, "WebKit Does HTML5 Client-side Database Storage," Oct. 19, 2007, Surfin' Safari Blog Archive, http://webkit.org/blog/126/webkit-does-html5-client-side-database-storage.

Final Office Action for U.S. Appl. No. 12/639,287, mailed Apr. 3, 2013, 11 pages.

Advisory Action for U.S. Appl. No. 12/639,287, mailed May 30, 2013, 3 pages.

Non-final Office Action for U.S. Appl. No. 12/639,287 mailed Sep. 13, 2012, 12 pages.

Examiner's Answer to U.S. Appl. No. 12/639,287, mailed Nov. 13, 2013, 8 pages.

* cited by examiner

SYSTEM AND METHOD FOR REDIRECTING CLIENT-SIDE STORAGE OPERATIONS

FIELD OF THE INVENTION

The present invention relates to data storage, and in particular to redirecting client-side storage operations to remote storage devices.

BACKGROUND OF THE INVENTION

It is common for a web site to store information on a client device. Cookies are one example of such client-side storage. Cookies retain information generated by a web site while the web site is being accessed by a user. An example of data that may be stored in a cookie is user account information, such as a user identifier and password, that may be used by a web site to automatically authenticate the user to the web site without requiring reentry by the user of their respective user identifier and password each time the user navigates to the web site.

Storing data on a client device provides several advantages to a web site. First, physical storage device requirements are decreased by storing data on the client device rather than on a central server maintained by a web site operator. Second, storing data on the client device allows additional processing to be performed by the client device rather than by the web site, improving the scalability of the web site. Accordingly, there is significant interest in utilizing client-side storage among web site developers. Additional client-side storage technologies, such as client-side database storage, are being introduced to help satisfy this interest.

Unfortunately, client-side storage can result in data being spread across multiple devices that may be used by a user to access a web site. For example, the user may access a web site from an internet-capable phone, such as an iPhone, when shopping, from a home computer when at home, and from a work computer when at work. Information stored in client-side storage will only be available to the device on which the information was stored. For example, items placed into a "wish list" by a user while accessing a web site from a work computer will not be available to the user when they later access the same web site from their home computer. Accordingly, what is needed is a mechanism for redirecting client-side operations to remote storage locations, so that data may be accessed by devices in addition to the client device to which the web site directed the data.

SUMMARY OF THE INVENTION

The present invention automatically redirects client-side storage operations to remote storage devices. For example, read and write operations that are directed to a client device are redirected to one or more remote storage devices. In one embodiment, a web service generates a hypertext transfer protocol (HTTP) message and sends the HTTP message toward a user agent executing on a client device. A redirection module in a path of the HTTP message analyzes the HTTP message and detects a client-side storage operation contained in the message. Based on a defined criteria, the redirection module modifies the HTTP message by replacing the client-side storage operation with a remote storage instruction. The modified HTTP message is sent toward the user agent in place of the original HTTP message. The user agent receives the modified HTTP message and executes the remote storage instructions, wherein the client-side storage operation is executed on a remote storage device.

The defined criteria may include a type of service provided by the web service, a source address of the web service, a type of data that is the subject of the client-side storage operation, and the like. For example, if the HTTP message relates to an email service, the redirection module may replace the client-side storage operation with remote storage instructions directed to an email remote storage device. If the source of the HTTP message is from a particular web site, such as the web site BUY.COM, the redirection module may replace the client-side storage operation with remote storage instructions directed to a home server remote storage device.

The client-side storage operation may be, for example, a hypertext markup language (HTML) local storage command, an HTML local session storage command, or an HTML local database storage command. The remote storage instruction may identify one or more remote storage devices and one or more remote storage proxies. The remote storage instruction may also include remote storage commands used by a remote storage device to implement remote storage operations on the remote storage device. The remote storage device may provide a response to the user agent based on the remote storage instructions.

The user agent may send the remote storage instructions to a remote storage proxy for processing. The remote storage proxy may extract one or more remote storage device identifiers from the remote storage instructions identifying the remote storage devices to which remote storage commands should be sent. The remote storage proxy provides the remote storage commands to the remote storage devices, thus reducing processing requirements of the user agent.

The redirection module may be implemented in a network node or in the client device hosting the user agent. The redirection module may be a module of the user agent. The redirection module accesses configuration data that includes the defined criteria. The HTTP message may include a plurality of client-side storage operations. Some of the client-side storage operations may be replaced with remote storage instructions directing the storage operations to a first remote storage device, and others of the client-side storage operations may be replaced with remote storage instructions directing such other storage operations to a second remote storage device.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
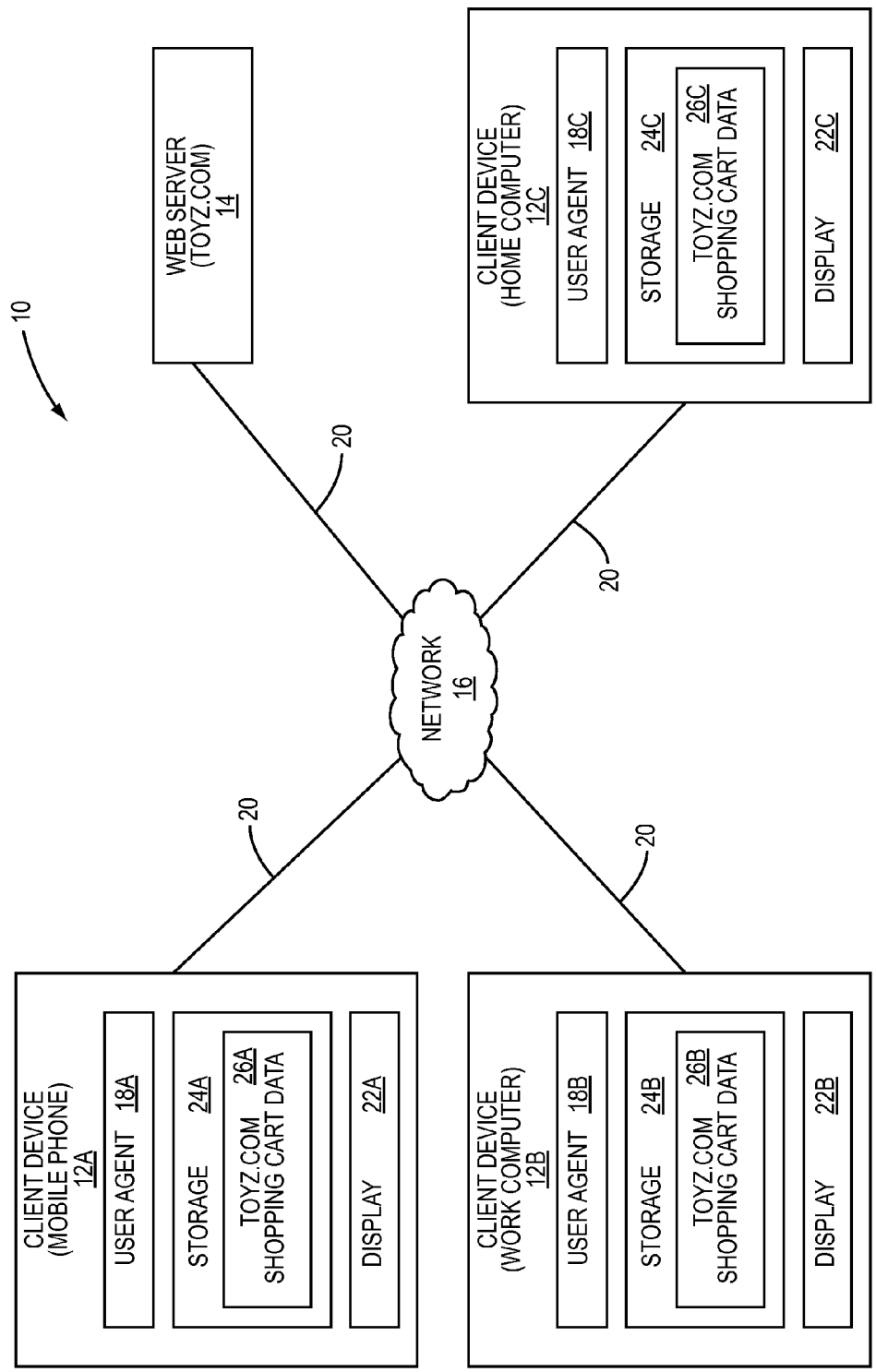
FIG. 1 illustrates a block diagram of a system using client-side storage operations for storing data on a client device.

The present invention includes a redirection module that redirects client-side storage operations from a client device to one or more remote storage devices. Prior to discussing certain aspects of the present invention, FIG. 1 illustrates a block diagram of a system 10 using client-side storage operations to store data generated by a web service. The system 10 includes a plurality of client devices 12A-12C which access a web server 14 via a network 16. One or more of the client devices 12A-12C may be referred to herein generally as the client device 12 or the client devices 12. The client device 12 may comprise any type of processing device capable of interacting with the web server 14, including, for example, a mobile phone, a work computer, a home computer, a digital video recorder (DVR), an electronic reader, and the like. The client devices 12A-12C typically have a user agent module 18A-18C, respectively, executing thereon. A user agent module 18A can comprise any combination of hardware and software modules capable of generating and interpreting messages exchanged with the web server 14. According to one embodiment of the invention, the user agent module 18 comprises a web browser, such as a Safari®, Explorer®, or FireFox® web browser.

The messages exchanged between the web server 14 and the client devices 12 can comprise any suitable message format and protocol capable of communicating the information necessary for the web server 14 to provide a desired web service to the client devices 12. According to one embodiment of the invention, the messages comprise hypertext transfer protocol (HTTP) messages.

The web server 14 may provide any type of web service to the client devices 12, such as, for example, a retail online shopping web service (e.g., the sale of toys via a www.toyz.com web site), a document generation and modification web service, an email web service, and the like. Generally, the user agent 18, such as the user agent 18A, generates and sends an HTTP message towards the web server 14 in response to input from a user. For example, the user may enter a URL such as www.toyz.com in an address window of the user agent 18A. The phrase "towards" means the HTTP message is being sent to an intended destination. The destination may be identified in the HTTP message, such as via a domain name or an internet protocol (IP) address, for example. In the present example, the HTTP message may contain an IP address identifying the web server 14, and the HTTP message is ultimately delivered to the web server 14 via the network 16 directly or indirectly through one or more intermediate network elements such as routers (not illustrated) and the like. The network 16 can comprise any proprietary or conventional network, or combination thereof, capable of routing messages between processing devices, such as the client devices 12 and the web server 14. Each of the client devices 12 and the web server 14 are coupled to the network 16 via an access link 20, which may comprise any suitable access technology, such as a cable or digital subscriber line (DSL) modem, WiFi, cellular technology, and the like.

In response to the HTTP message from the client device 12A, the web server 14 generates an HTTP response message and sends the HTTP response message towards the client device 12A. The HTTP response message may include a message body portion containing instructions that direct the user agent 18A to display information on a display 22A. The message body portion may comprise an HTML document, for example. The message body portion may also include one or more client-side storage operations that direct the user agent 18A to access a client-side storage 24A integral with, or coupled to, the client device 12A. The client-side storage 24A may comprise any suitable storage medium, including, for example, a hard disk drive, a flash drive, a USB drive, and the like. The client-side storage operations can comprise any type of conventional or proprietary storage instructions, such as, for example local storage instructions, session storage instructions, database storage instructions, and the like. The client-side storage operations may comprise a web storage command as defined by the W3C in one or more W3C specification documents, such as the Web Storage W3C Working Draft 29 Oct. 2009, available at www.w3.org, the contents of which are hereby incorporated herein by reference. One example of a type of data that may be stored on the client device 12A is shopping cart data 26A identifying one or more products the user has selected for purchase from the web server 14.

Assume for the purposes of illustration that the user selects a particular product for purchase from the web server 14 via the user agent 18A. The user agent 18A generates an HTTP message identifying the product and sends the HTTP message towards the web server 14. The web server 14 receives the HTTP message, generates an HTTP message including client-side storage instructions directing the user agent 18A to store product identification information identifying the selected product in the client-side storage 24A, and then sends the HTTP message towards the user agent 18A via the client device 12A. The client device 12A provides the HTTP message to the user agent 18A, which executes the client-side storage instructions and stores the product identification information in the client-side storage 24A. For purposes of illustration, assume the user is interrupted and is unable to consummate the purchase at that time.

Assume further that the user later accesses the web server 14 via the client device 12C while at home. While the client-side storage 24C similarly contains shopping cart data 26C, the shopping cart data 26C does not contain the product identification information previously stored in the shopping cart data 26A because the client-side storage operations previously generated by the web server 14 were directed to the client device 12A, not the client device 12C. This example illustrates one problem with client-side storage inherent in many web services; the information stored on a client device 12, such as the client device 12A, is not easily, or perhaps not at all, accessible by other client devices 12, such as the client devices 12B and 12C. Thus, the user must repeat on the client device 12C the steps that were previously performed on the client device 12A to identify and select the desired product from the web server 14.

Figure 2:
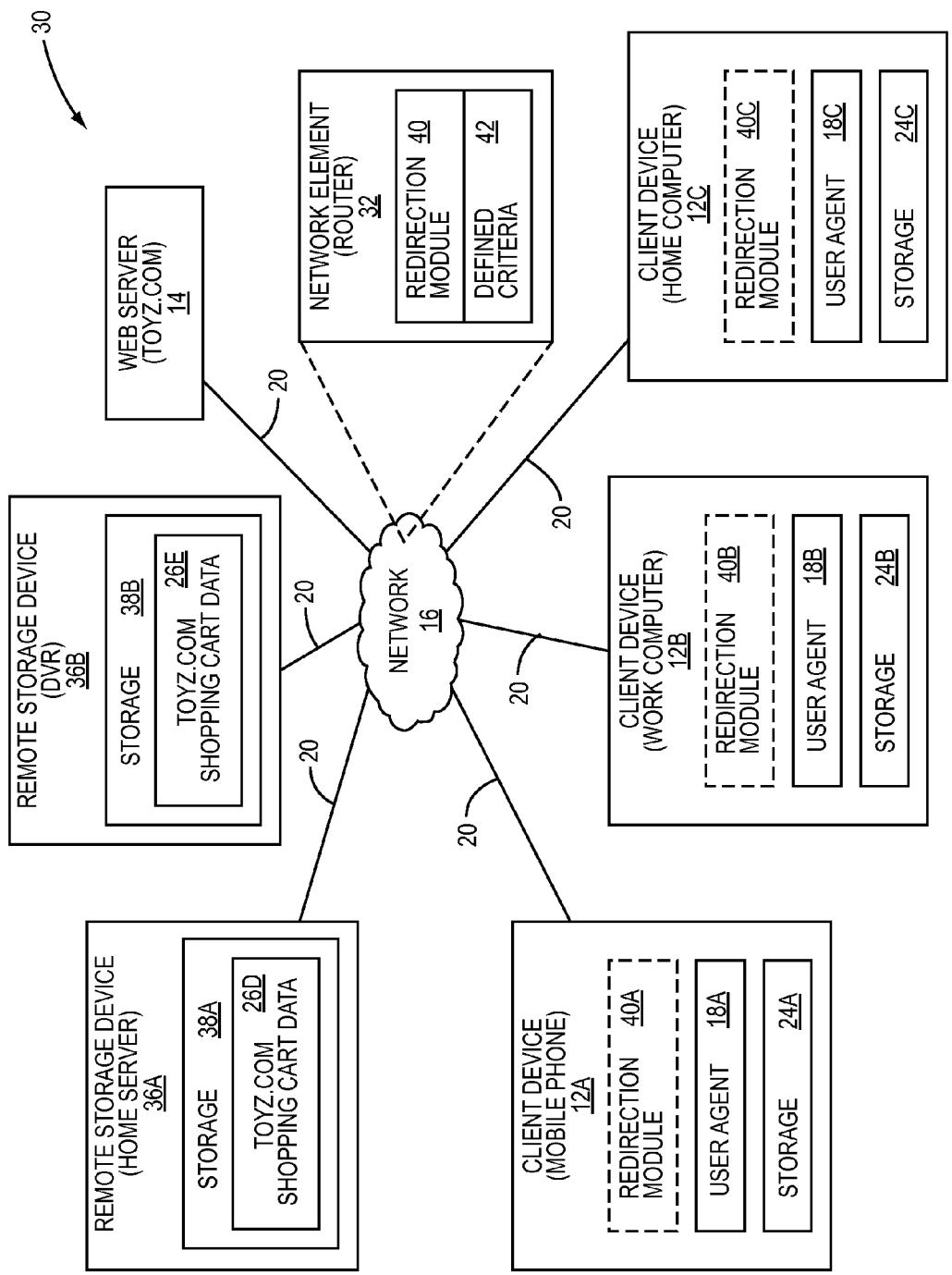
FIG. 2 is a block diagram of a system utilizing the present invention.

FIG. 2 is a block diagram of a system 30 utilizing the present invention. The system 30 includes the client devices 12A-12C and the web server 14. A network element 32, such as a router, proxy server, and the like, is coupled to a path of messages that are exchanged between the client devices 12A-12C and the web server 14. The phrase "coupled to the path" includes being directly in the path of such messages, such as, for example, where the network element 32 comprises a proxy server that provides service to each of the client devices 12A-12C, or, alternatively, receiving the messages from such a device. For example, the network element 32 may comprise a device that directs another device that is directly in the path of such messages, such as a proxy server, to provide the messages to the network element 32.

The system 30 also includes one or more remote storage devices 36, such as remote storage devices 36A, 36B which are coupled to the network 16 via the respective access links 20. One or more of the remote storage devices 36A, 36B may be referred herein to generally as the remote storage device 36 or the remote storage devices 36. The remote storage device 36 may comprise any processing device capable of storing, modifying, or otherwise accessing data in a respective storage 38A, 38B upon request. For example, the remote storage device 36 may comprise a general purpose computer, such as a laptop computer, a desktop computer, a computer server, and the like, or a specialized computing device, such as a DVR, a media server, and the like. The storage devices 38A, 38B may comprise any suitable storage medium, including, for example, a hard disk drive, a flash drive, a USB drive, and the like.

The network element 32 includes a redirection module 40. The redirection module 40 detects a client-side storage operation directed to a client device 12 in an HTTP message, translates the client-side storage operation into remote storage instructions based on defined criteria 42, and generates a modified HTTP message wherein the client-side storage operation is replaced with the remote storage instructions. The defined criteria 42 are maintained in a configuration file accessible to the redirection module 40. Preferably, the configuration file is maintained in a memory on the network element 32.

The defined criteria 42 are used by the redirection module 40 to determine whether client-side storage instructions contained in a HTTP message should be translated into remote storage instructions, and if so, the particular remote storage devices 36A, 36B to which the remote storage instructions should refer. The defined criteria 42 can include criteria based on one or more attributes of the HTTP message, criteria based on the client device 12 to which the HTTP message is addressed, criteria based on contextual information such as time or date, and the like. Criteria based one or more attributes of the HTTP message can include, for example, a type of service associated with the HTTP message, a type of data that is the subject of the client-side storage operations contained in the HTTP message, or a source address, such as a domain or URL of the HTTP message. Criteria based on the client device 12 to which the HTTP message is directed can include, for example, an address associated with the client device 12, a location of the client device 12, a proximity of the client device 12 to another client device 12, and the like. Location information of a mobile client device 12 may be obtained by the network element 32 in any known manner, such as via a location detecting service, or via the service provider providing service to the mobile client device 12.

Upon determination by the redirection module 40 that the HTTP message contains a client-side storage operation which should be translated into a remote storage instruction based on the defined criteria 42, the redirection module 40 then determines the appropriate remote storage instructions necessary to implement the storage operations on the respective remote storage devices 36. The defined criteria 42 may include rewrite functions that analyze the client-side storage operations and generate remote storage instructions suitable for implementing the client-side storage operations on the designated remote storage device 36. According to one embodiment, the rewrite functions may be implemented via a programmatic language, such as JavaScript, Java, and the like. So long as the rewrite functions are written to a common interface, the rewrite functions may also be 'pluggable' such that the redirection module 40 may initiate rewrite functions on an as needed basis. In one embodiment, a third party, such as a web service, may provide the rewrite function for use with HTTP messages originating from the respective web service.

Table 1 contains an exemplary client-side storage operation that may be detected in an HTTP message by the redirection module.

TABLE 1

```
function addItemToShoppingCart( ) {
    db.transaction( function (tx) {
        tx.executeSql("INSERT INTO ShoppingCart (id, name,
        quantity, timestamp ) VALUES (?, ?, ?, ?)", [item.id, item.name,
        item.quantity, item.timestamp] );
    });
}
```

Table 2 contains pseudo-code for an exemplary rewrite function that determines whether the HTTP message matches the defined criteria 42, and if so, rewrites the client-side storage operations into appropriate remote storage instructions based on the particular remote storage device 36. In this example, the defined criteria 42 relates to a location of the client device 12, and a source of the HTTP message. In particular, if the client device 12 is at a "home" location and the HTTP message is from a "goggle.com" source, then the defined criteria 42 is met, as indicated by the <match-function> pseudo-code. The <rewrite-function> pseudo-code generates remote storage instructions including identified IP addresses of the remote storage devices 36, and generates remote-storage instructions based on the type of user agent 18.

TABLE 2

```
<rewrite-rule>
<name>
Distributed To My Home Devices
</name>
<author>
Alice
</author>
<match-function>
boolean doesMatch( client_device, data ) {
if ( client_device.location is "home" ) {
if ( data.source equals "goggle.com" ) {
// client-side storage function detected?
if ( data.content contains "window.openDatabase" ) {
// yes
return true;
}
}
}
return false;
}
</match-function>
<rewrite-function>
var remote_storage_devices = [ 192.168.1.101, 192.168.1.102 ];
data rewrite( client_device, original_data ) {
data modified_data = original_data.copy( );
```

TABLE 2-continued

```
if ( client_device.user_agent matches ["IE7", "Firefox", "Chrome"] ) {
modified_data.include( "var xmlhttp = new XmlHttpRequest( );";
} else {
modified_data.include( "var xmlhttp = new ActiveXObject(
Microsoft.XMLHTTP);";
}
list listOfStorageInstructions = findStorageInstructions(
modified_data );
foreach (StorageInstruction in listOfStorageInstructions) {
string code = createReplacementCode(StorageInstruction,
remote_storage_devices );
modified_data.replace(StorageInstruction.text, code );
}
return modified_data;
}
</rewrite-function>
</rewrite-rule>
```

Table 3 contains exemplary remote storage instructions that may be generated by the pseudocode illustrated in Table 2 based on the exemplary client-side storage operations illustrated in Table 1.

TABLE 3

```
function addItemToShoppingCart( ) {
        var xmlhttp = new XmlHttpRequest( );
        var parameters = "SQL=INSERT INTO ShoppingCart
(id, name, quantity, timestamp ) VALUES (" + item.id + "," +
item.name + "," + item.quantity + "," + item.timestamp + ")";
        var remoteStorageLocations = new Array(
"192.168.1.101", "192.168.1.102" );
        var xmlhttp = new XmlHttpRequest( );
        for ( i = 0; i < remoteStorageLocations.length; i++ ) {
            xmlhttp.open( "POST", "http://"
+ remoteStorageLocations.length[i] + "/distributedDB", false );
            xmlhttp.setRequestHeader("Content-type",
"application/x-www-form-urlencoded");
            xmlhttp.setRequestHeader("Content-length",
parameters.length);
            xmlhttp.setRequestHeader("Connection",
"close");
            xmlhttp.send( parameters );
        }
    }
```

After the modified HTTP message containing the remote storage instructions is generated, the redirection module 40 sends the modified HTTP message towards the user agent 18 via the client device 12, which is identified as the destination in the HTTP message. The user agent 18 receives the modified HTTP message and executes the remote storage instructions. In one embodiment, the remote storage instructions may include the destination address of the remote storage devices 36, and remote storage commands that are to be sent to each of the respective remote storage devices 36. For example, assume the redirection module 40 detects database client-side storage operations in an HTTP message. The redirection module 40 may replace the client-side storage operations with AJAX commands that, upon execution, send corresponding commands to the appropriate remote storage devices 36 to implement the storage operations on the remote storage devices 36.

In one embodiment, the modified HTTP message may also include feedback instructions, along with media, that provide feedback to a user while the remote storage operations are being processed. For example, the feedback instructions may include a progress meter that shows a current status of the remote storage operations.

Security or network restrictions may prevent a user agent 18 from making a connection to another device, such as one or more of the remote devices 36. According to one embodiment of the invention, to avoid such restrictions, the redirection module 40 may generate a script, such as a JavaScript, and store the script on a device accessible to the user agent 18, such as the network element 32. In such embodiment, the redirection module 40 modifies the HTTP message to include a remote storage instruction that comprises a reference to the stored script. The script may comprise remote storage device identifiers, such as IP addresses of the remote storage devices 36, and remote storage commands implementing the client-side operations on the respective remote storage device(s) 36. The script may be digitally signed and hosted by the network element 32, or another trusted source. Upon receipt of the modified HTTP message, the user agent 18 retrieves the instructions from the stored script. Because the instructions were obtained from a digitally signed script, the user agent 18 may not be prevented from opening a connection with the remote storage devices 36.

Table 4, below, provides an example of a remote storage instruction comprising a reference to a script generated by the redirection module 40 and stored on a device having an IP address "192.168.1.1.".

TABLE 4

```
<html>
[...]
<script language="text/javascript"
src="http://192.168.1.1/request/123456789.js">
<script language="text/javascript">
[...]
function addItemToShoppingCart( ) {
    doTrustedOperation( item.id, item.name, item.quantity,
        item.timestamp );
}
</script>
[...]
</html>
```

Table 5, below, contains remote storage commands that may be stored in the script file referenced in Table 4. Upon receipt of the modified HTTP message, the user agent 18 obtains the JavaScript referenced in Table 4, above, and loads the remote storage commands from the JavaScript as illustrated in Table 5, below. Table 5 includes pseudo code representing remote storage commands that implement storage operations on the remote storage devices 36. In the example provided in Table 5, the remote storage devices 36 have IP addresses "192.168.1.101", and "192.168.1.102", respectively.

TABLE 5

```
function doTrustedOperation( var itemId, var itemName, var
        itemQuantity, var itemTimestamp ) {
    var xmlhttp = new XmlHttpRequest( );
    var parameters = "SQL=INSERT INTO ShoppingCart (id, name,
    quantity, timestamp ) VALUES (" + itemId + "," + itemName +
    "," + itemQuantity + "," + itemTimestamp + ")";
    var remoteStorageLocations = new Array( "192.168.1.101",
        "192.168.1.102" );
    var xmlhttp = new XmlHttpRequest( );
    for ( i = 0; i < remoteStorageLocations.length; i++ ) {
        xmlhttp.open( "POST", "http://" +
remoteStorageLocations.length[i] + "/distributedDB", false );
        xmlhttp.setRequestHeader("Content-type", "application/x-www-
form-urlencoded");
        xmlhttp.setRequestHeader("Content-length", parameters.length);
        xmlhttp.setRequestHeader("Connection", "close");
        xmlhttp.send( parameters );
    }
}
```

While for purposes of illustration the redirection module 40 has been described as being implemented in the network element 32, according to one embodiment of the invention the redirection module 40 may be implemented in one or more of the client devices 12A-12C, as represented by dashed boxes 40A-40C.

Figure 3:
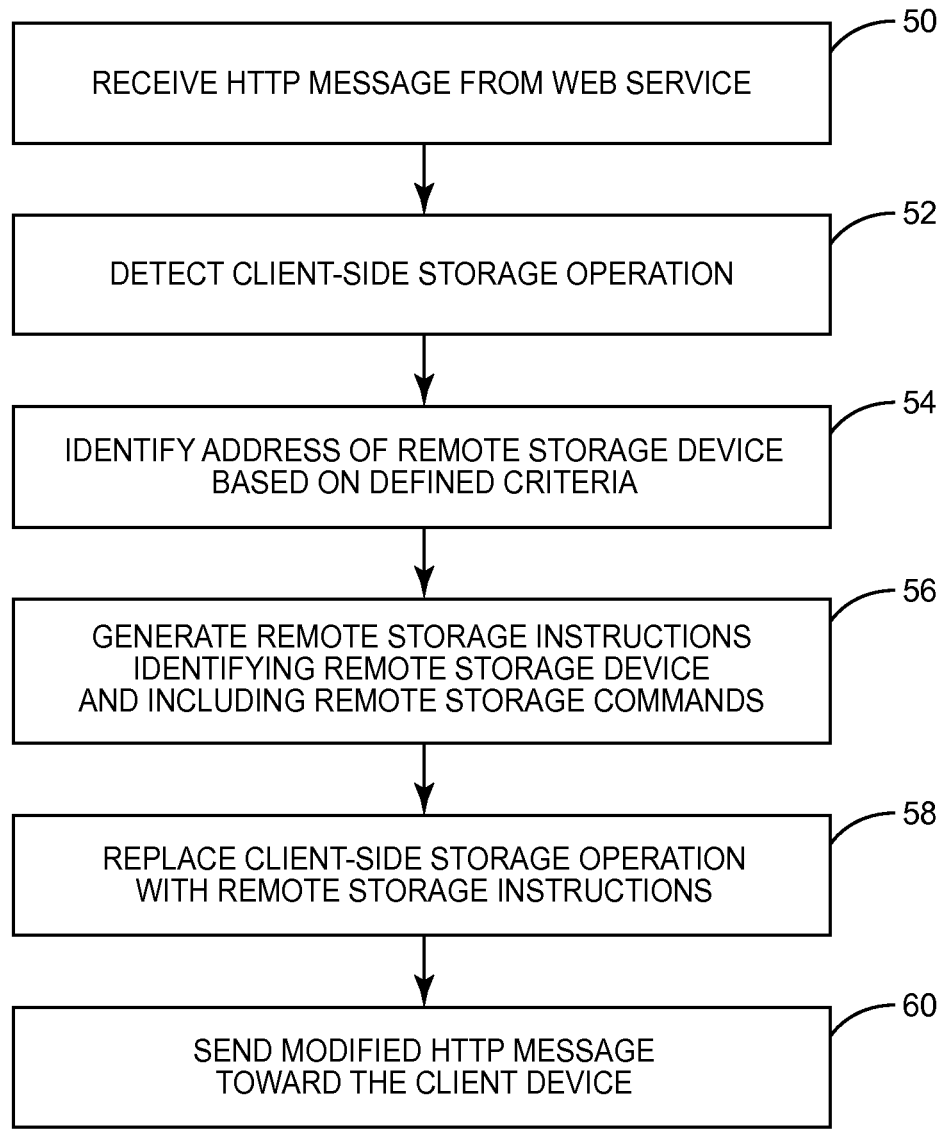
FIG. 3 is a flow chart illustrating steps performed by a redirection module for an exemplary HTTP message containing a client-side storage operation according to one embodiment of the invention.

FIG. 3 is a flow chart illustrating steps performed at the redirection module 40 for an exemplary HTTP message containing a client-side storage operation. FIG. 3 will be discussed in conjunction with FIG. 2. Assume that the user agent 18A executing on the client device 12A has, at the direction of a user, sent an HTTP message to the web server 14. For example, the user may have entered the URL of the web server 14 into the user agent 18A to indicate a desire to load the home page of the web server 14. In response, the web server 14 generates and sends an HTTP message towards the client device 12A. The network element 32, coupled to the path of the HTTP message, receives the HTTP message from the web server 14, which, in this example, provides a service from the website "www.toyz.com" (step 50). The redirection module 40 detects in the HTTP message a client-side storage operation (step 52). For example, the HTTP message may include a client-side storage operation that obtains a locally stored user identifier (ID) of the user associated with the client device 12A, and password information, for purposes of authenticating the client device 12A to the web service.

The redirection module 40 accesses the defined criteria 42 and determines, based on the defined criteria 42, that the client-side storage operations should be redirected to the remote storage devices 36A, 36B. The redirection module 40 generates remote storage instructions identifying the remote storage devices 36A, 36B. For example, the remote storage devices 36A, 36B may be identified via IP addresses associated with the remote storage devices 36A, 36B (step 54). The remote storage instructions may include remote storage commands that implement the desired storage operations on the remote storage devices 36A, 36B (step 56). The redirection module 40 generates a modified HTTP message by replacing the one or more client-side storage operations with one or more remote storage instructions (step 58). The redirection module 40 sends the modified HTTP message toward the user agent 18A via the client device 12A (step 60).

Figure 4:
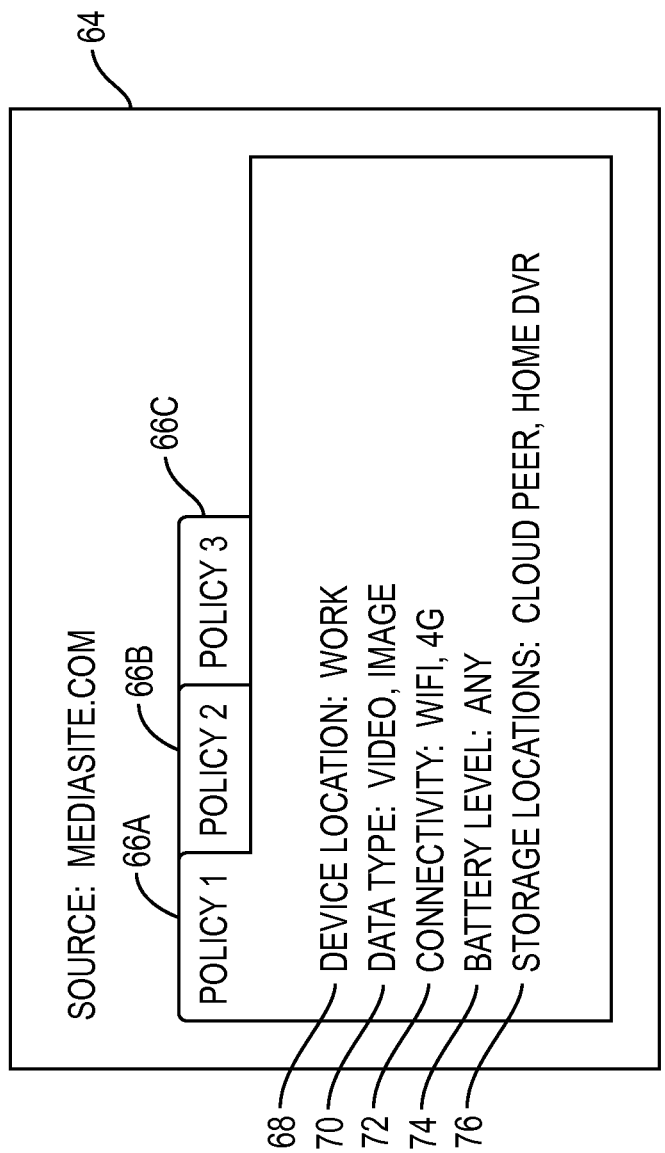
FIG. 4 is a block diagram illustrating an exemplary user interface that may be used to define the defined criteria used by the redirection module.

According to one embodiment of the invention, the redirection module 40 may use contextual information to determine whether or not to replace client-side storage operations with remote storage instructions. In such embodiment, a synchronization mechanism may be used to ensure that data contained in client-side storage locations and appropriate remote storage devices 36 are synchronized periodically. FIG. 4 is a block diagram illustrating an exemplary user interface 64 that may be used to define the defined criteria 42 used by the redirection module 40 to determine whether client-side storage operations should be replaced with remote storage instructions. In this example, the defined criteria 42 relates to a web service "mediasite.com." The user interface window 64 may include a plurality of policy tabs 66A-66C. For purposes of illustration, the contents of only the policy tab 66A are shown in FIG. 4. The policy tab 66A may include defined criteria 42 including a device location identifier 68, a data type identifier 70, a connectivity type identifier 72, and a battery level identifier 74. The policy tab 66A may also include a remote storage device identifier 76, which identifies the particular remote storage devices 36A to which the remote storage instructions should be sent. The device location identifier 68 may identify, for example, a work location, a home location, and the like. As discussed previously, the redirection module 40 may obtain a current location of the client device 12 in any conventional or proprietary manner, including, for example, via a location detection service, information provided by a service provider, and the like.

The data type identifier 70 may identify a type of data that is the subject of the client-side storage operations, such as video data, image data, and the like. For example, based on the criteria illustrated in FIG. 4, the client-side storage operations may be replaced with remote storage instructions only if the data type of the data associated with the client-side storage operations is a video type or an image type. The connectivity identifier 72 may identify a type of connection used by the client device 12A such as, WiFi or 4G. Thus, the redirection module 40 may replace client-side storage operations with remote storage instructions only when the connectivity of the client device 12A is WiFi connectivity or 4G connectivity.

The battery level identifier 74 can indicate a battery level threshold. For example, if a battery level of the client device 12 is below an identified threshold, the redirection module 40 will replace client-side storage operations with remote storage instructions, but if the battery level of the client device 12 is above the identified threshold, the client-side storage operations will not be replaced. Those of skill in the art will recognize the identifiers 68-74 are merely exemplary, and that any desired criteria could be defined and used by the redirection module 40.

Figure 5:
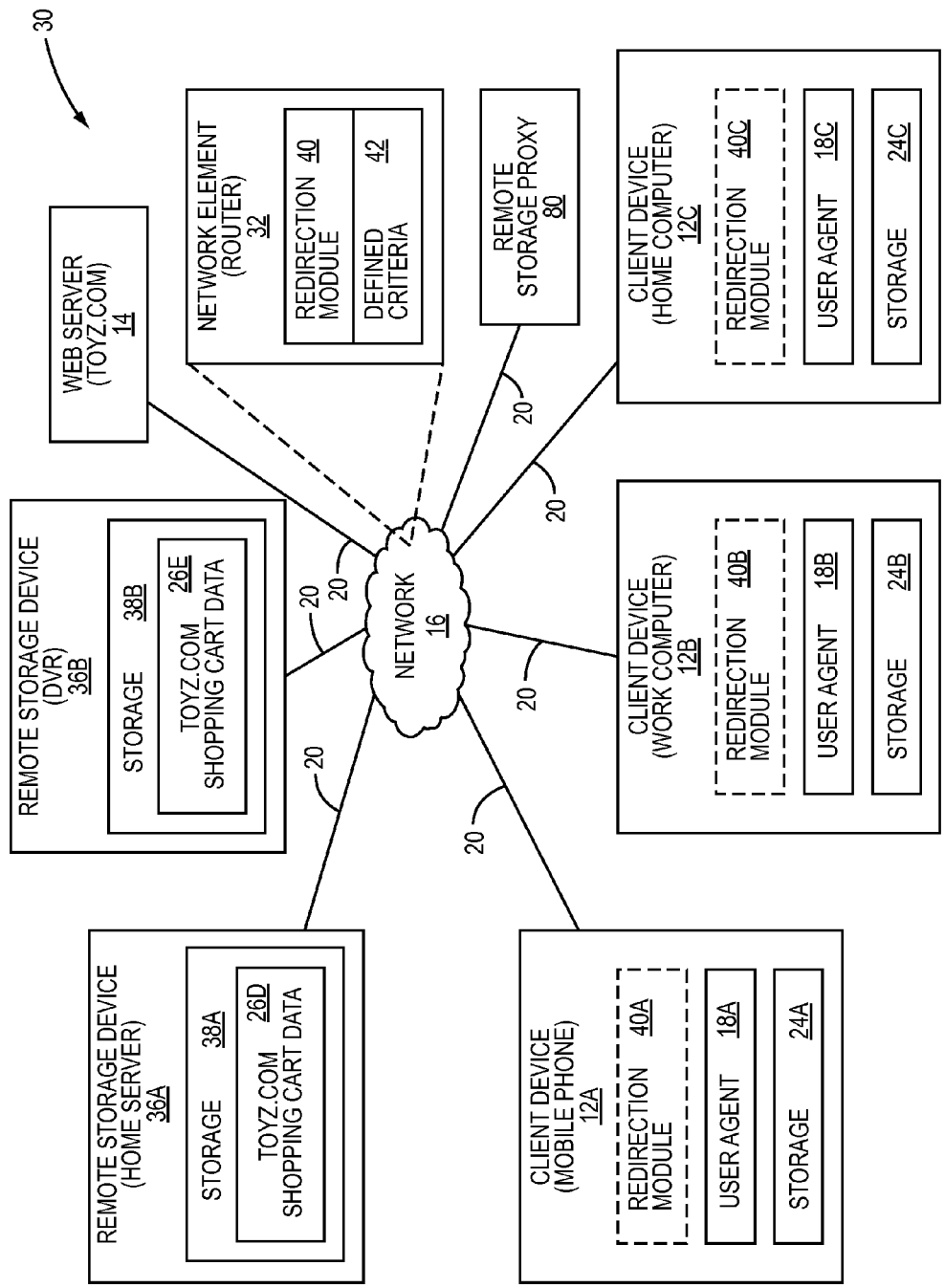
FIG. 5 is a block diagram illustrating a remote storage proxy according to one embodiment on the invention.

As discussed above, restrictions associated with the client device 12 or the network 16 may prevent the user agent 18 from directly connecting to a remote storage device 36. According to another embodiment of the present invention, such restrictions may be avoided through the use of a remote storage proxy. FIG. 5 is a block diagram illustrating a remote storage proxy 80 according to one embodiment of the invention. In this embodiment, the redirection module 40 generates remote storage instructions that include an identifier of the remote storage proxy 80. The remote storage instructions may also include one or more identifiers identifying appropriate remote storage devices 36, and appropriate remote storage commands for implementing the desired storage operations on the remote storage devices 36. The redirection module 40 sends the modified HTTP request towards to the user agent 18A via the client device 12A. The remote storage instructions include instructions that cause the user agent 18A to send an HTTP message toward the originating web server 14 that generated the original HTTP message. Sending the HTTP message toward the original web server 14 may avoid network security restrictions. The user agent 18A sends the HTTP message towards the web server 14. A mediating server, such as the network element 32 or other server, receives the HTTP message. The HTTP message includes an identifier identifying to the network element 32 that the HTTP message, or a portion thereof, should be sent to the remote storage proxy 80, and not delivered to the web server 14. The network element 32 sends remote storage instructions contained in the HTTP message to the remote storage proxy 80.

The remote storage proxy 80 receives the remote storage instructions, and directs the remote storage commands to the remote storage devices 36 identified in the remote storage instructions. In this manner, security restrictions preventing the user agent 18 from connecting to a device other than the originating web server 14 can be circumvented. The remote storage proxy 80 may serve additional functions, such as caching database information from the remote storage devices 36, load balancing requests across the remote storage devices 36, maintaining persistent connections to the remote storage devices 36 for quicker access, and the like. While the remote storage proxy 80 is illustrated for purposes of convenience in FIG. 5 as a separate entity from the network element 32, the remote storage proxy 80 may be a module integral with the network element 32.

Figure 6:
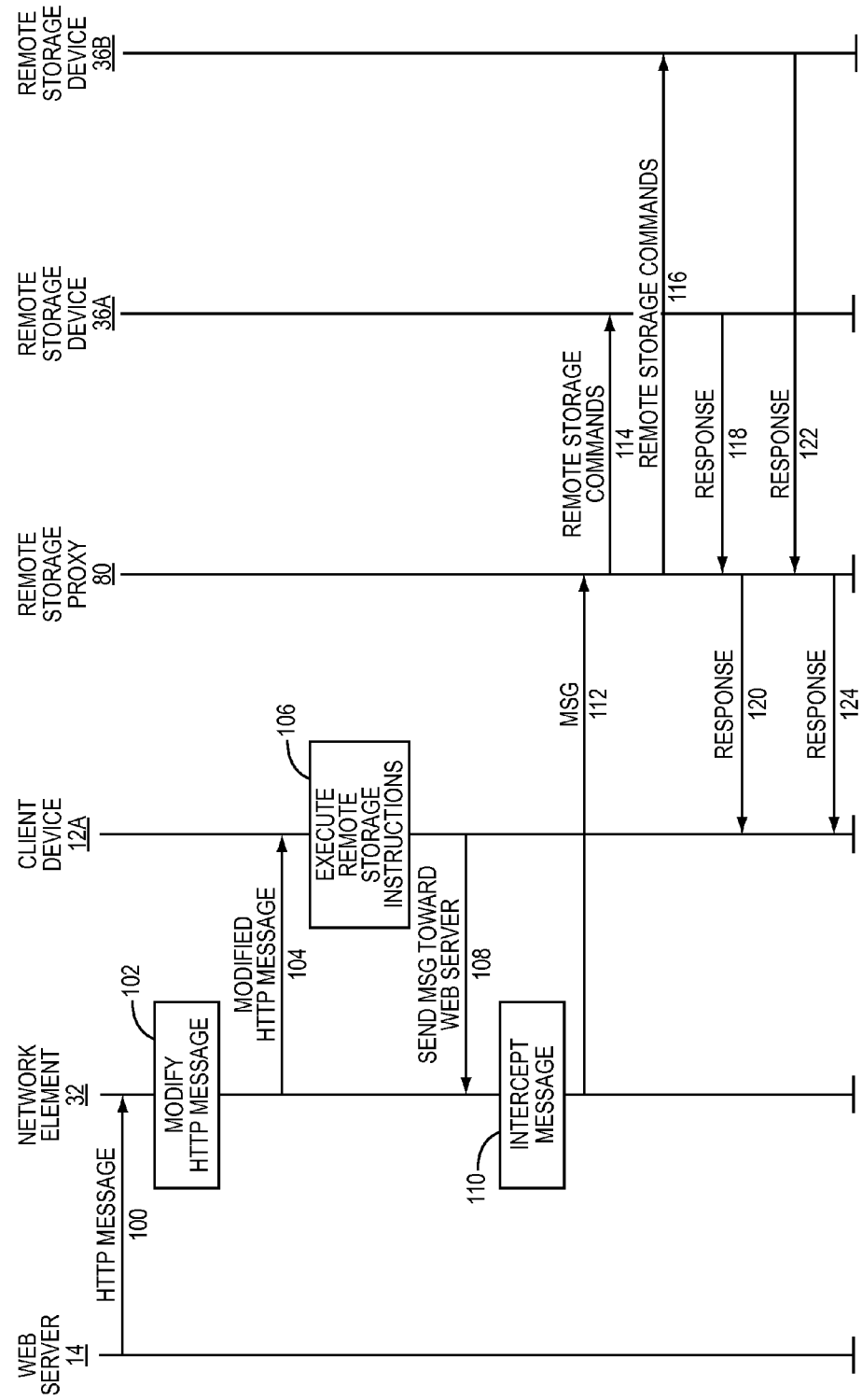
FIG. 6 is a message flow diagram illustrating an exemplary message flow, wherein remote storage instructions include an identifier of the remote storage proxy.

FIG. 6 is a message flow diagram illustrating an exemplary message flow, wherein remote storage instructions include an identifier of the remote storage proxy 80. FIG. 6 will be discussed in conjunction with FIG. 5. Assume the web server 14 has received a request from the client device 12A. The web server 14 generates an HTTP message and sends the HTTP message towards the client device 12A (step 100). The network element 32 receives the HTTP message, determines that the HTTP message includes a client-side storage operation, and accesses the defined criteria 42. The redirection module 40 generates remote storage instructions including a remote storage proxy identifier identifying the remote storage proxy 80, the remote storage devices 36A, 36B, and remote storage commands implementing the desired storage operations on the remote storage devices 36A, 36B, respectively (step 102). Table 6, below, illustrates exemplary remote storage instructions that may be generated and stored in the modified HTTP message in accordance with one embodiment of the present invention.

TABLE 6

```
var xmlhttp = new XmlHttpRequest( );
var parameters = "SQL=UPDATE Notes SET note = ?, timestamp =
?, WHERE id = ?\n";
parameters += "param1=" + eval( note.text ) + "\n";
parameters += "param2=" + eval( note.timestamp ) + "\n";
parameters += "param3=" + eval( note.id ) + "\n";
var xmlhttp = new XmlHttpRequest( );
// the open web site source of the original content to bypass
networking restrictions
    xmlhttp.open( "POST", "http://www.google.com/", false );
xmlhttp.setRequestHeader("distributedRemoteStorageProxyRequest",
    "true"); // special request for proxy
    xmlhttp.setRequestHeader("distributedRemoteStorageProxy",
        "192.168.1.105" ); //IP address for proxy
    xmlhttp.setRequestHeader("distributedRemoteStorageLocations",
RemoteStorageLocations); // the list of remote storage locations to contact for the
db storage operations
    xmlhttp.setRequestHeader("Content-type", "application/x-www-
        form-urlencoded");
    xmlhttp.setRequestHeader("Content-length", parameters.length);
    xmlhttp.setRequestHeader("Connection", "close");
    xmlhttp.send( parameters );
```

The redirection module 40 sends the modified HTTP message towards the client device 12A (step 104). The user agent 18A executes the remote storage instructions (step 106). The execution of the remote storage instructions causes an HTTP message to be sent towards the web server 14 (step 108). The network element 32, acting as a mediating server, receives the HTTP message and determines that the HTTP message includes a remote storage proxy request (step 110). The network element 32 sends the remote storage instructions to the remote storage proxy 80 (step 112). The HTTP message is not sent to the web server 14. The remote storage proxy 80 receives the remote storage instructions and sends the identified remote storage commands to the remote storage devices 36A, 36B, respectively (steps 114-116). The remote storage devices 36A, 36B send responses to the remote storage proxy 80 in response to the execution of the remote storage commands (steps 118, 122). The remote storage proxy 80 provides the responses to the client device 12A (steps 120, 124). In this manner, client-side storage operations may be redirected to remote storage devices 36A, 36B even in the presence of network or device restrictions inhibiting a user agent 18 from sending responses to devices other than the device from which the user agent 18 received the response. While for purposes of convenience the network element 32 has been described as the recipient of the remote storage instructions sent by the user agent 18A, it will be apparent to those skilled in the art, that another network element such as a proxy server or mediating server could be the recipient of the remote storage instructions.

Figure 7:
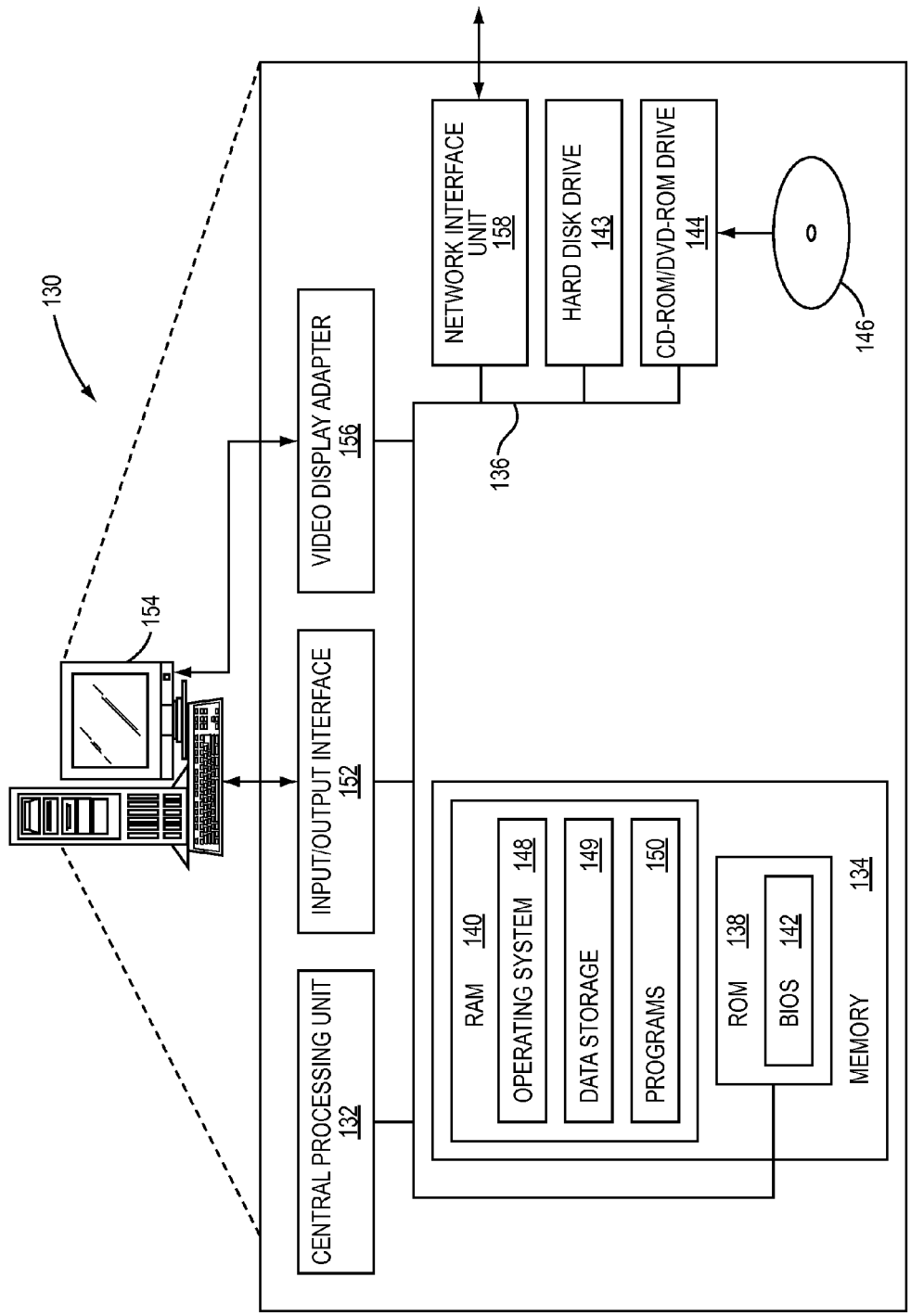
FIG. 7 illustrates components of an exemplary processing device which may be used to implement a client device, web server, or network element.

FIG. 7 illustrates components of an exemplary processing device 130 which may be used to implement the client device 12, the web server 14, or the network element 32. The exemplary processing device 130 includes a central processing unit 132, a system memory 134 and a system bus 136. The system bus 136 provides an interface for system components including, but not limited to, the system memory 134 to the processing unit 132. The processing unit 132 can be any of various commercially available processors. Dual microprocessors and other multi-processor architectures may also be employed as the processing unit 132.

The system bus 136 can be any of several types of bus structure that may further interconnect to a memory bus (with or without a memory controller), a peripheral bus, and a local bus using any of a variety of commercially available bus architectures. The system memory 134 can include non-volatile memory 138 and/or volatile memory 140 (e.g., random access memory (RAM)). A basic input/output system (BIOS) 142 can be stored in the non-volatile memory 138 (e.g., ROM, EPROM, EEPROM, etc.), which can include the basic routines that help to transfer information between elements within the processing device 130. The volatile memory 140 can also include a high-speed RAM such as static RAM for caching data.

The processing device 130 may further include an internal hard disk drive (HDD) 143 (e.g., EIDE, SATA) for storage. The internal hard disk may also be configured for external use in a suitable chassis, such as an optical disk drive 144 (e.g., reading a CD-ROM disk 146). The drives and associated computer-readable media provide nonvolatile storage of data, data structures, computer-executable instructions, and so forth. For the processing device 130, the drives and media accommodate the storage of any data in a suitable digital format. Although the description of computer-readable media above refers to a HDD and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 140, including an operating system 148, one or more application programs 150, including, for example, a redirection module 40 and/or user agent 18, and other program modules. All or portions of the operating system, applications, modules, and/or data storage 149 can also be cached in the volatile memory 140. It is to be appreciated that the disclosed architecture can be implemented with various commercially available operating systems or combinations of operating systems. All or a portion of the invention may be implemented as a computer program product, such as a computer usable medium having a computer readable program code embodied therein. The computer readable program code can include software instructions for implementing the functionality of the redirection module 40, and other aspects of the present invention, as discussed herein.

A user can enter commands and information into the processing device 130 through one or more wire/wireless input devices, for example, a keyboard and a pointing device, such as a mouse (not illustrated). Other input devices (not illustrated) may include a microphone, an IR remote control, a joystick, a game pad, a stylus pen, touch screen, or the like. These and other input devices are often connected to the processing unit 132 through an input device interface 152 that is coupled to the system bus 136, but can be connected by other interfaces such as a parallel port, IEEE 1394 serial port, a game port, a USB port, an IR interface, etc.

The processing device 130 may include a display 154, which may also be connected to the system bus 136 via an interface, such as a video adaptor 156. The processing device 130 may operate in a networked environment using wire and/or wireless communication network interface or adaptor 158. The adaptor 158 can facilitate wire and/or wireless communications to the network 16.

The processing device 130 may be operable to communicate with any wireless devices or entities operatively disposed in wireless communication, for example, a printer, scanner, desktop and/or portable computer, via wireless technologies, such as Wi-Fi and Bluetooth, for example.

Those skilled in the art will recognize improvements and modifications to the preferred embodiments of the present invention. All such improvements and modifications are considered within the scope of the concepts disclosed herein and the claims that follow.

What is claimed is:

1. A method for modifying an HTTP message, comprising:
   receiving an HTTP message from a server addressed to a user agent executing on a client device;
   detecting in the HTTP message a client-side storage operation directed to the client device, the client-side storage operation directing the client device to store data on the client device;
   translating the client-side storage operation into remote storage instructions based on a defined criteria, wherein the remote storage instructions direct the client device to store the data on a remote storage device, and wherein the remote storage instructions comprise a remote storage device identifier identifying the remote storage device, and at least one remote storage command implementing the client-side storage operation on the remote storage device; and
   modifying the HTTP message to generate a modified HTTP message wherein the client-side storage operation is replaced with the remote storage instructions.

2. The method of claim 1 wherein the remote storage instructions further comprise:
   a plurality of remote storage device identifiers, each of the plurality of remote storage device identifiers identifying a corresponding remote storage device, and for each of the remote storage device identifiers, at least one remote storage command implementing the client-side storage operation on the corresponding remote storage device.

3. The method of claim 1 further comprising sending the modified HTTP message toward the user agent.

4. The method of claim 3 wherein the remote storage instructions further comprises a remote storage proxy identifier identifying a remote storage proxy.

5. The method of claim 4 further comprising receiving, by the remote storage proxy, the remote storage instructions from the user agent.

6. The method of claim 5 further comprising sending, by the remote storage proxy, a remote storage command to a remote storage device.

7. The method of claim 1 wherein the defined criteria comprises a current location of the client device.

8. The method of claim 1 wherein the defined criteria comprises a type of service identified in the HTTP message.

9. The method of claim 1 wherein the defined criteria comprises a type of data associated with the client-side storage operation.

10. The method of claim 1 wherein the defined criteria comprises a source of data associated with the client-side storage operation.

11. An apparatus comprising:
    a communications interface adapted to communicate with a network; and
    a redirection module coupled to the communications interface and adapted to:
      receive an HTTP message from a server addressed to a user agent executing on a client device;
      detect in the HTTP message a client-side storage operation directed to the client device, the client-side storage operation directing the client device to store data on the client device;
      translate the client-side storage operation into remote storage instructions based on a defined criteria, wherein the remote storage instructions direct the client device to store the data on a remote storage device, and wherein the remote storage instructions comprise a remote storage device identifier identifying the remote storage device, and at least one remote storage command implementing the client-side storage operation on the remote storage device; and
      modify the HTTP message to generate a modified HTTP message wherein the client-side storage operation is replaced with the remote storage instructions.

12. The apparatus of claim 11 wherein the apparatus comprises a network element, and wherein the redirection module is further adapted to send the modified HTTP message toward the client device.

13. The apparatus of claim 11 wherein the apparatus comprises the client device.

14. A computer program product comprising a non-transitory computer usable medium having a computer readable program code embodied therein, said computer readable program code adapted to be executed to implement a method for modifying an HTTP message, said method comprising:
    receiving an HTTP message from a server addressed to a user agent executing on a client device;

detecting, in the HTTP message, a client-side storage operation directed to the client device, the client-side storage operation directing the client device to store data on the client device;

translating the client-side storage operation into remote storage instructions based on a defined criteria, wherein the remote storage instructions direct the client device to store the data on a remote storage device, and wherein the remote storage instructions comprise a remote storage device identifier identifying the remote storage device, and at least one remote storage command implementing the client-side storage operation on the remote storage device; and modifying the HTTP message to generate a modified HTTP message wherein the client-side storage operation is replaced with the remote storage instructions.

15. The computer program product of claim 14 wherein the remote storage instructions further comprise a remote storage proxy identifier identifying a remote storage proxy.

16. The computer program product of claim 14 wherein the defined criteria comprises a current location of the client device.

17. A method for modifying an HTTP message, comprising:

receiving an HTTP message from a server addressed to a user agent executing on a client device;

detecting in the HTTP message a client-side storage operation directed to the client device, the client-side storage operation directing the client device to store data on the client device;

translating the client-side storage operation into remote storage instructions based on a defined criteria, the remote storage instructions directing the client device to store the data on a remote storage device, and wherein the remote storage instructions comprise a remote storage device identifier identifying the remote storage device, and at least one remote storage command implementing the client-side storage operation on the remote storage device; and modifying the HTTP message to generate a modified HTTP message wherein the client-side storage operation is replaced with the remote storage instructions such that when executed by the client device the data is stored on the remote storage device instead of the client device.

* * * * *